(12) United States Patent
Rugano

(10) Patent No.: US 11,293,153 B1
(45) Date of Patent: Apr. 5, 2022

(54) EROSION SOIL CONTROL WATTLE

(71) Applicant: Mary N Rugano, Birmingham, AL (US)

(72) Inventor: Mary N Rugano, Birmingham, AL (US)

( * ) Notice: Subject to any disclaimer, the term of this patent is extended or adjusted under 35 U.S.C. 154(b) by 0 days.

(21) Appl. No.: 17/220,389

(22) Filed: Apr. 1, 2021

(51) Int. Cl.
*E02B 3/12* (2006.01)
*E02D 17/20* (2006.01)

(52) U.S. Cl.
CPC ............ *E02B 3/127* (2013.01); *E02D 17/202* (2013.01); *E02D 2200/13* (2013.01); *E02D 2200/1621* (2013.01)

(58) Field of Classification Search
CPC ......... E02B 3/04; E02B 3/127; E02D 17/202; E02D 2200/13; E02D 2200/1621
See application file for complete search history.

(56) References Cited

U.S. PATENT DOCUMENTS

| | | | | |
|---|---|---|---|---|
| 3,373,568 A * | 3/1968 | Hornbostel, Jr. | ......... | E02B 3/04 405/21 |
| 3,888,197 A * | 6/1975 | Seith et al. | ............ | A01G 25/02 111/200 |
| 3,888,418 A * | 6/1975 | Seith et al. | ............ | A01C 1/044 239/145 |
| 3,957,098 A * | 5/1976 | Hepworth et al. | ..... | B65D 33/00 383/45 |
| 5,951,202 A * | 9/1999 | Brown | .................... | E02B 3/122 405/19 |
| 6,905,289 B1 * | 6/2005 | Sanguinetti | ............. | E02B 3/108 405/107 |
| 2002/0131827 A1 * | 9/2002 | Spangler et al. | ......... | E02B 3/04 405/302.6 |
| 2003/0010968 A1 * | 1/2003 | Hendrickson | ............. | E02B 3/04 256/12.5 |
| 2003/0031511 A1 * | 2/2003 | Tyler | ......................... | B65B 1/04 405/15 |
| 2004/0005198 A1 * | 1/2004 | Spangler et al. | ......... | E02B 3/04 405/302.6 |
| 2004/0079699 A1 * | 4/2004 | Engwer | ................... | E02B 3/125 210/602 |
| 2005/0047875 A1 * | 3/2005 | Marchant | ................ | E02B 3/127 405/302.6 |
| 2005/0254899 A1 * | 11/2005 | Tyler | ......................... | E03F 1/00 405/15 |
| 2007/0003369 A1 * | 1/2007 | Hanson et al. | ........... | E02B 3/04 405/19 |
| 2009/0257827 A1 * | 10/2009 | Wilson | ...................... | E02B 3/04 405/21 |
| 2019/0024338 A1 * | 1/2019 | Carretero et al. | .... | E02D 17/202 |

FOREIGN PATENT DOCUMENTS

| | | | | |
|---|---|---|---|---|
| EP | 0952259 A2 * | 10/1999 | ............. | E02B 3/122 |
| WO | WO-2009015830 A1 * | 2/2009 | ............... | E02B 3/04 |
| WO | WO-2017165765 A1 * | 9/2017 | ............. | E02B 3/108 |

* cited by examiner

Primary Examiner — Tara Mayo-Pinnock
(74) Attorney, Agent, or Firm — Christopher R. Ganter, LLC

(57) ABSTRACT

An erosion control wattle formed using parallel rows of loops that interlock with succeeding and preceding rows of loops and forms a hollow tubular sock whereby biomass is inserted into hollow tubular sock and deployed in areas whereby erosion is likely to occur and whereby said erosion control wattle blocks high volume flow of water and filters turbid water.

8 Claims, 3 Drawing Sheets

EROSION SOIL CONTROL WATTLE

FIELD OF THE INVENTION

The present invention relates to an erosion soil control device wattle that designed to contain biodegradable material and is highly customizable in shape to accommodate variable terrain conditions.

BACKGROUND OF THE INVENTION

As a result of developing land and the erection of man-made structures, erosion of soil on ground surfaces and slopes is a common problem. Certain topographical features of a piece of land and/or recently disturbed soil are leading causes of erosion and must be addressed in order to preserve the integrity of the land in its original state. If erosion is not controlled or prevented, the land becomes deeply eroded and becomes unusable unless expensive remediation steps are taken to restore the land to its previous state. Additionally, erosion causes the introduction of soil particles and organic matter into waterways which causes harmful turbidity color change and enhanced microbiologic activity which can deplete oxygen in the water. A number of solutions to prevent erosion issues exist in the art. One such solution is an erosion wattle or erosion log. An erosion wattle as exists presently in the art is a tubular device that is woven or fused of a netted or weaved material which is stuffed with biodegradable material. The erosion wattle is then deployed on the ground to prevent downhill water flow and also to filter water that is flowing on soil. A problem with present erosion wattles is that their woven and/or matrix fused construction does not allow for easy flexibility on uneven ground surfaces. Further, many wattles in existence are formed of non-biodegradable substances such as plastic which can cause harm to the environment and wildlife. What is needed in the art is an erosion wattle that is highly flexible and biodegradable.

SUMMARY OF THE INVENTION

The present invention is a tubular erosion wattle that is formed by using a knitting process as opposed to a weaving or fused process. The wattle is formed of jute twine which is a natural fiber produced from flowering plants in the genus Corchorus. The soft and elastic nature of jute twine along with the flexible and stretchable nature of the wattle itself because of its knitted formation allow for an optimum combination to allow the wattle to conform to most any uneven surface. Knitting is a technique for producing a two-dimensional fabric made from a one-dimensional yarn or thread. In weaving, threads are always straight, running parallel either lengthwise (warp threads) or crosswise (weft threads). By contrast, the yarn in knitted fabrics follows a meandering path or a course, forming symmetric loops (also called bights) symmetrically above and below the mean path of the yarn. These meandering loops can be easily stretched in different directions giving knit fabrics much more elasticity than woven fabrics. Depending on the yarn and knitting pattern, knitted garments can stretch as much as 500%. For this reason, knitting was initially developed for garments that must be elastic or stretch in response to the wearer's motions, such as socks and hosiery. For comparison, woven garments stretch mainly along one or other of a related pair of directions that lie roughly diagonally between the warp and the weft, while contracting in the other direction of the pair and are not very elastic, unless they are woven from stretchable synthetic material which is cost prohibitive. Knitted garments are often more form-fitting than woven garments, since their elasticity allows them to contour to the body's outline more closely. This flexible and stretchable nature of knitted garments applies equally to a knitted erosion wattle. The flexible and stretchable nature of a knitted wattle allows for the wattle to easily conform to an uneven ground surface.

DETAILED DESCRIPTION

Figure 1:
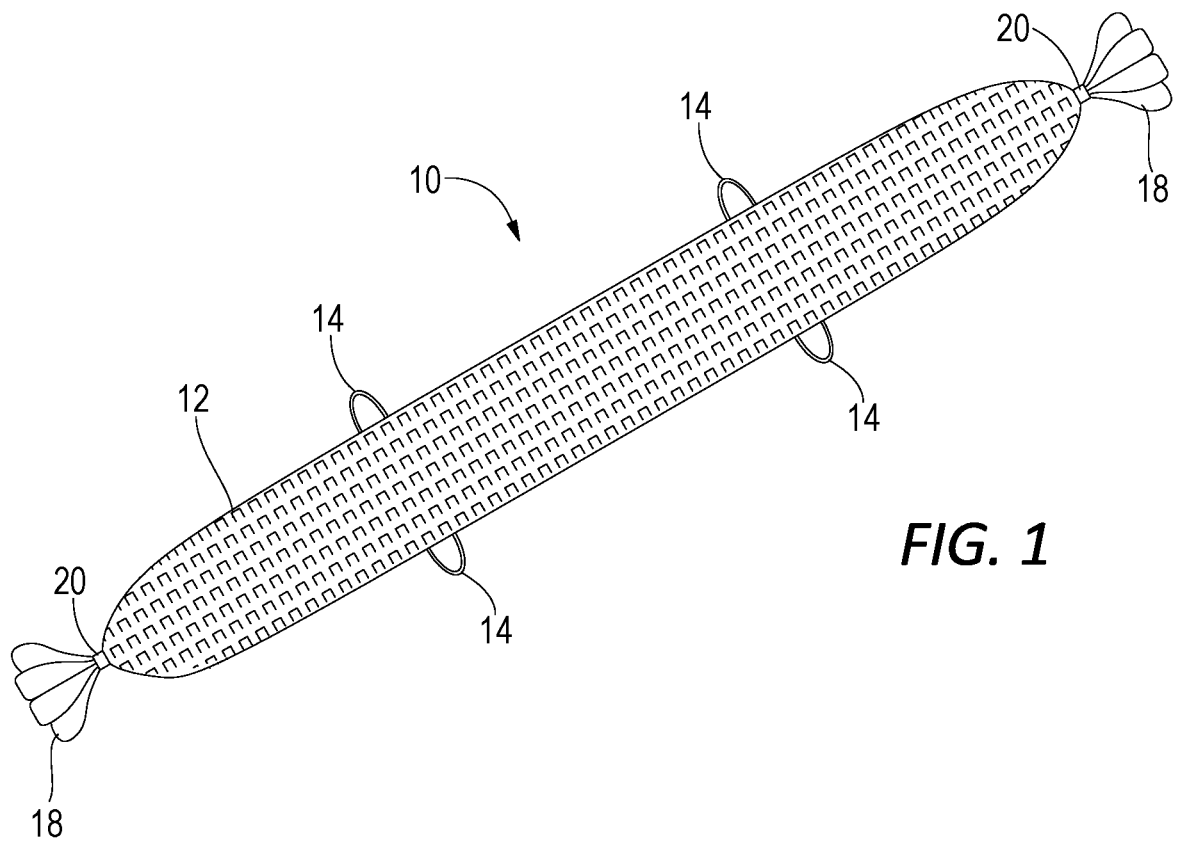
FIG. 1 is a front perspective view of the erosion wattle.
Figure 2:
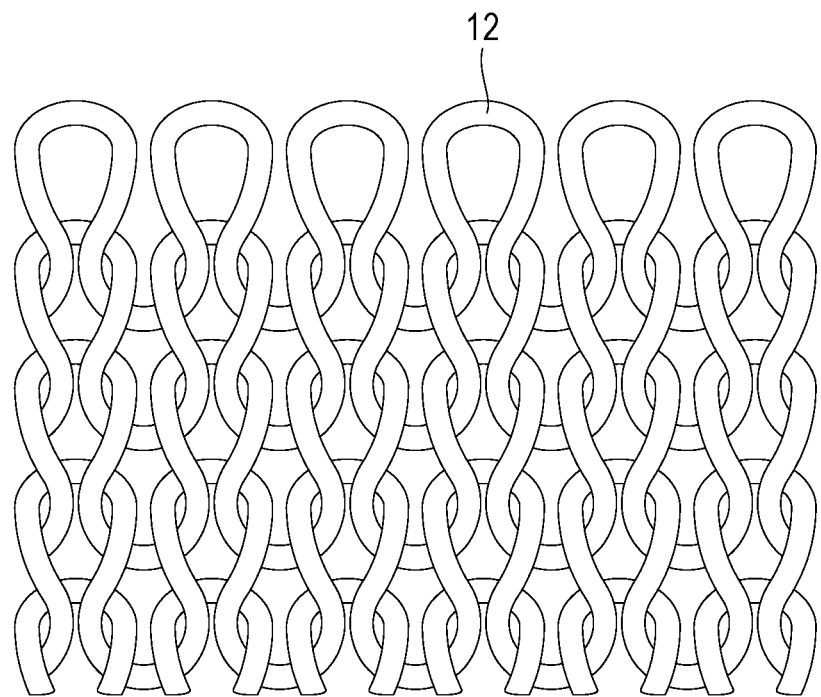
FIG. 2 is a magnified view of the wattle showing a knitted pattern used in the wattle construction.

Referring now to FIG. 1, there is shown a front perspective view of wattle 10 positioned on the ground. The wattle 10 is formed, in one embodiment, from jute twine 12. The jute twine 12 is one continuous strand of twine and formed through various knitting stitch patterns. One such stitching pattern is illustrated in FIG. 2. The flexible and stretchable nature of a knitted erosion wattle 10 allows the wattle 10 to occupy and closely fit the undulations of a particular piece of land or ground and can even occupy short and small divots in the ground whereas a woven wattle would span across and above the divot and not sink down into the divot thereby being unable to prevent unfiltered water from passing under a woven wattle. The flexible and stretchable nature of the knitted wattle also greatly enhances the ease at which a wattle can be loaded with biodegradable plant-based materials such as straw or other materials. Further, forming a knitted wattle increases the density of the outer wattle 10 itself because a knitted wattle 10 bunches the jute twine 12 much more densely together than a simple woven wattle. This enhances the filtration capability of the wattle 10 by forcing water to go through a thicker filter that the wattle 10 serves as.

Figure 3:
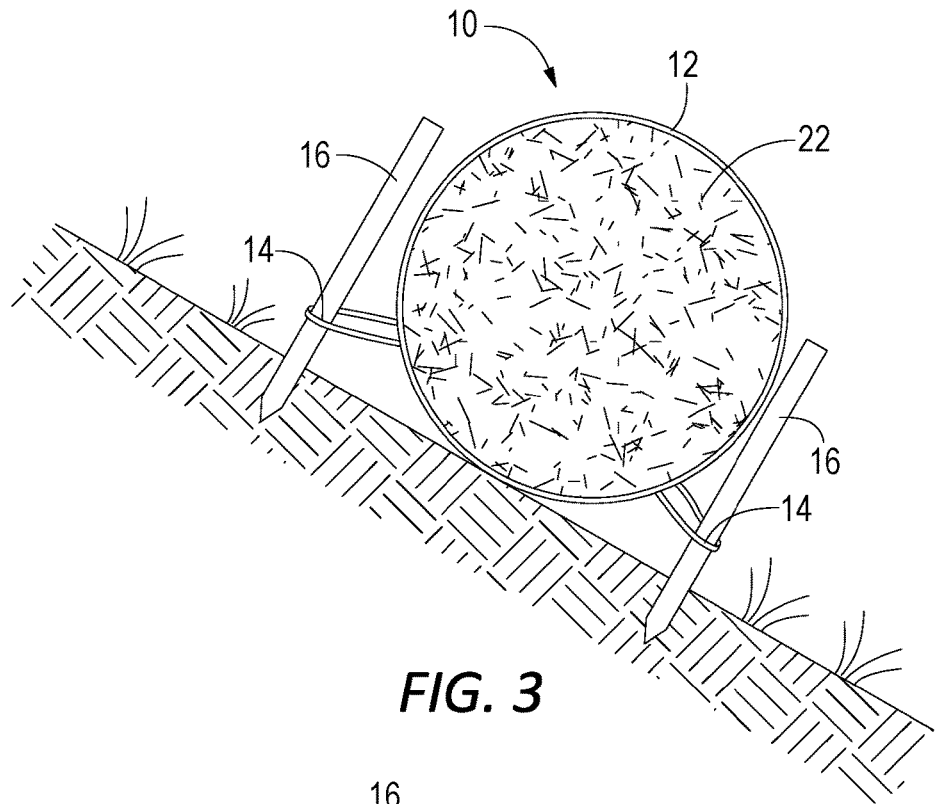
FIG. 3 is a side view of the wattle installed on hillside and staked into the ground.
Figure 4:
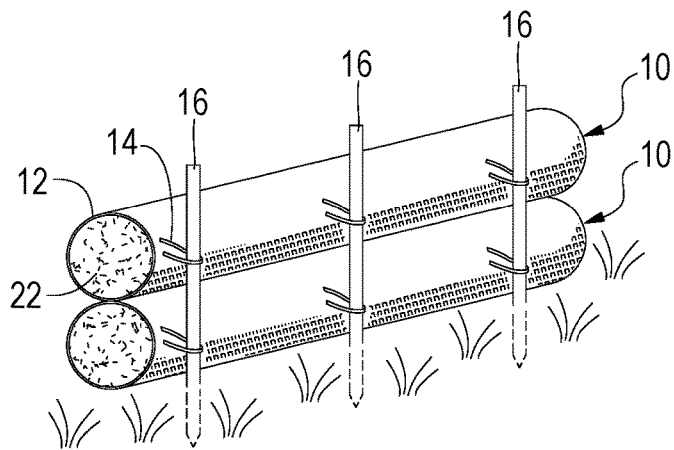
FIG. 4 is a perspective view of wattles stacked on top of each other and staked to the ground.
Figure 5:
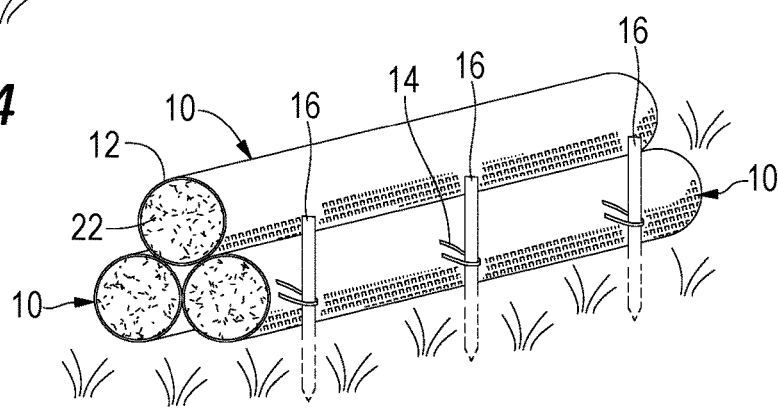
FIG. 5 is a perspective view of an alternate embodiment of a plurality of wattles stacked on top of each other and staked to the ground.
Figure 6:
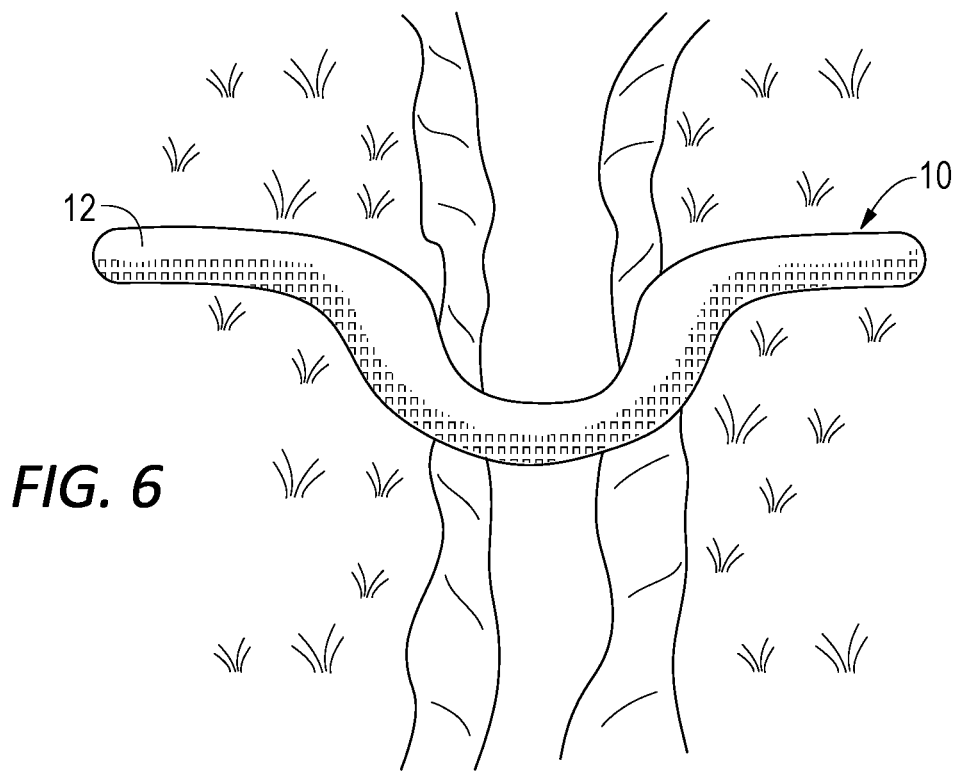
FIG. 6 is a perspective view of a wattle conforming to an uneven ground surface.
Figure 7:
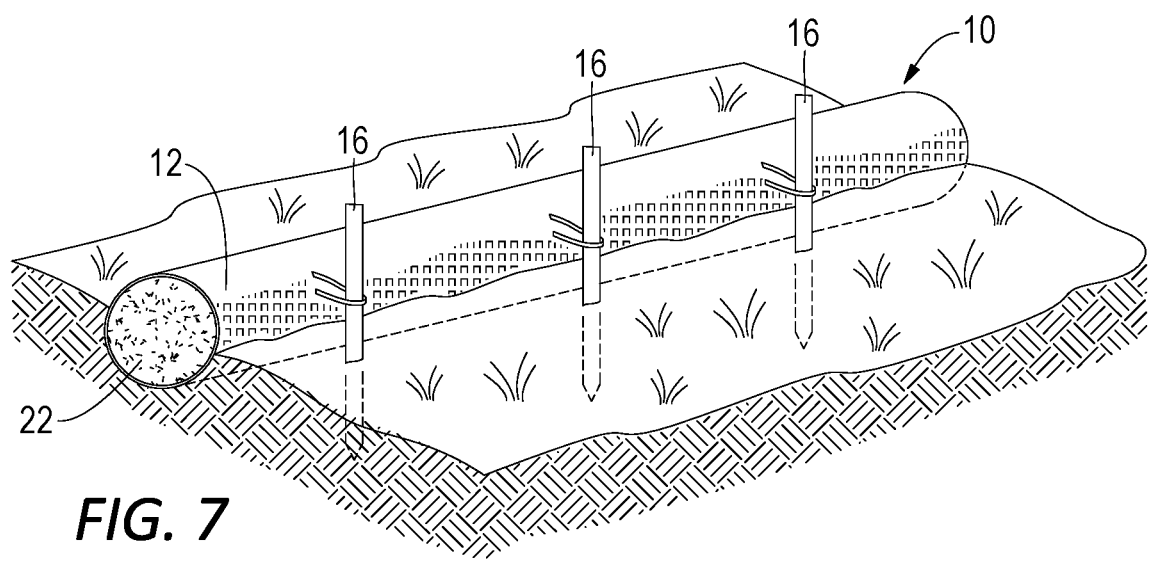
FIG. 7 is a perspective view of an alternate use of the wattle conforming to an uneven ground surface.

As shown in FIGS. 1, 3 and 4, the wattle has handles 14 located on its outer circumference that are used to lift and position the wattle into a desired position. The handles 14 are also used as staking points such that a stake does not penetrate the wattle and damage the wattle and its water filtering capacity. The handles 14 also act as staking points have stakes 16 inserted into them to prevent shifting of the wattle 10 on hillsides or in high flow runoff situations where the sheer force of flowing water could dislodge the wattle 10 off its intended position. The handles 14 further enable the wattle 10 to be stackable on another wattle 10 whereby a stake 16 is inserted into the respective handles 14 of each said wattle 10 such that the wattles 10 are kept in tight stackable connection.

In use, either an operator or a factory installs biodegradable plant-based material such as straw or other biomass 22 into the wattle 10. One end 18 of the wattle 10 will be sealed shut by using a closure device 20 such as a zip tie, knotted cord, a staple, a clamp or any other suitable device that can seal up an open end 18 of a wattle. Once the wattle 10 has been sufficiently filled with biomass 22, the other end 18 of the wattle is sealed shut by using a closure device 20. The wattle 10 or a plurality of wattles 10 are placed in appropriate areas identified by the operator such that erosion is mitigated during periods of rainfall.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

ENUMERATED ELEMENTS 10 wattle
12 twine
14 handles
16 stake
18 end
20 closure device
22 biomass

What I claim is:

1. An erosion control wattle, comprising:
    a hollow tubular sock formed using a single strand of twine whereby loops of said twine are interlaced in a series of succeeding parallel rows of loops that intermesh with preceding parallel rows of loops;
    an opening on each end of said wattle;
    a volume of biomass introduced into said erosion control wattle whereby said wattle is placed on the ground in an area of concern and filters water run-off through said biomass and said tubular sock; and
    a closure device adapted to close off each end of the erosion control wattle.

2. The erosion control wattle of claim 1 further comprising a plurality of handles located at positions around a circumference of the erosion control wattle and along the length of the wattle.

3. The erosion control wattle of claim 2 further comprising a plurality of stakes insertable into said handles of said erosion control wattle.

4. The erosion control wattle of claim 3 wherein said wattle can be stacked on top of one or more wattles to increase the effective height of said wattles and the width of a filtration zone of said wattles and inserting a plurality of stakes through corresponding handles of said wattles.

5. The erosion control wattle of claim 1 wherein the intermeshing loops that form the erosion control wattle allow for flexibility and elasticity and the twine is jute twine.

6. The erosion control wattle of claim 5 further comprising a plurality of handles located at positions around a circumference of the erosion control wattle and along the length of the wattle.

7. The erosion control wattle of claim 6 further comprising a plurality of stakes insertable into said handles of said erosion control wattle.

8. The erosion control wattle of claim 7 wherein said wattle can be stacked on top of one or more wattles to increase the effective height of said wattles and the width of a filtration zone of said wattles and inserting a plurality of stakes through corresponding handles of said wattles.

* * * * *